(12) United States Patent
Lin et al.

(10) Patent No.: US 11,646,925 B2
(45) Date of Patent: May 9, 2023

(54) DATA-PACKET PREAMBLE SEQUENCE AND PACKET HEADER, AND PROCESSING METHOD AND DATA FRAME THEREOF

(71) Applicant: Espressif Systems (Shanghai) Co., Ltd., Shanghai (CN)

(72) Inventors: Hao Lin, Shanghai (CN); Rui Zhan, Shanghai (CN)

(73) Assignee: Espressif Systems (Shanghai) Co., Ltd., Shanghai (CN)

( * ) Notice: Subject to any disclaimer, the term of this patent is extended or adjusted under 35 U.S.C. 154(b) by 588 days.

(21) Appl. No.: 16/318,561

(22) PCT Filed: Aug. 18, 2016

(86) PCT No.: PCT/CN2016/095829
§ 371 (c)(1),
(2) Date: Jan. 17, 2019

(87) PCT Pub. No.: WO2018/014409
PCT Pub. Date: Jan. 25, 2018

(65) Prior Publication Data
US 2019/0246403 A1 Aug. 8, 2019

(30) Foreign Application Priority Data
Jul. 18, 2016 (CN) .......................... 201610562913.1

(51) Int. Cl.
*H04L 1/00* (2006.01)
*H04W 28/06* (2009.01)
(Continued)

(52) U.S. Cl.
CPC ........... *H04L 27/2613* (2013.01); *H04B 1/69* (2013.01); *H04B 1/707* (2013.01); *H04B 1/7115* (2013.01);
(Continued)

(58) Field of Classification Search
CPC . H04W 72/0466; H04W 28/06; H04W 28/04; H04W 80/08; H04W 80/02;
(Continued)

(56) References Cited

U.S. PATENT DOCUMENTS 6,002,709 A 12/1999 Hendrickson
6,731,624 B1* 5/2004 Maekawa ............. H04J 3/0608
370/350
(Continued)

FOREIGN PATENT DOCUMENTS

| CN | 1809994 | 7/2006 |
|---|---|---|
| CN | 101228688 | 7/2008 |
| CN | 102694559 | 9/2012 |

*Primary Examiner* — Joshua Kading
(74) *Attorney, Agent, or Firm* — Reinhart Boerner Van Deuren P.C.

(57) ABSTRACT

The present invention discloses a method for processing a preamble sequence and header for a data packet, comprising the following steps of: using a bit sequence of a fixed pattern to replace a scrambled pseudo-random bit sequence in a SYNC field in the preamble sequence, and spreading the SYNC field by a Barker code; extending a length of a spreading code and spreading an SFD field in the preamble sequence by the extended spreading code; and extending a length of a spreading code and spreading a header field by the extended spreading code. The present invention may significantly improve the performance of reception and detection for the preamble sequence (the SYNC field and the SFD field) and the PLCP header field, better overcome long-distance channel conditions, enhance the signal stability of transmission; and meanwhile the present invention is easy to implement and only requires little modifications to the circuit of a conventional Wi-Fi device.

6 Claims, 1 Drawing Sheet

(51) Int. Cl.

| | |
|---|---|
| *H04W 28/04* | (2009.01) |
| *H04L 27/26* | (2006.01) |
| *H04W 72/044* | (2023.01) |
| *H04J 3/06* | (2006.01) |
| *H04W 80/08* | (2009.01) |
| *H04B 1/7115* | (2018.01) |
| *H04B 17/29* | (2015.01) |
| *H04B 1/707* | (2011.01) |
| *H04B 1/69* | (2011.01) |

(52) U.S. Cl.
CPC ............ *H04B 17/29* (2015.01); *H04J 3/0605* (2013.01); *H04L 1/00* (2013.01); *H04L 1/0061* (2013.01); *H04W 28/04* (2013.01); *H04W 28/06* (2013.01); *H04W 72/0466* (2013.01); *H04W 80/08* (2013.01)

(58) Field of Classification Search
CPC ......... H04W 4/70; H04B 17/29; H04B 1/707; H04B 1/69; H04B 1/7115; H04L 1/00; H04L 1/0061; H04L 27/2613; H04L 1/0008; H04J 3/0605
See application file for complete search history.

(56) References Cited

U.S. PATENT DOCUMENTS

| | | | |
|---|---|---|---|
| 8,300,740 B1* | 10/2012 | Yang | H04L 1/206 375/343 |
| 9,300,353 B1* | 3/2016 | Hekstra | H04L 1/0083 |
| 2004/0032825 A1* | 2/2004 | Halford | H04L 27/0008 370/208 |
| 2004/0052268 A1* | 3/2004 | Lewin | H04L 12/2881 370/430 |
| 2004/0205438 A1* | 10/2004 | Chien | H04L 1/0045 714/746 |
| 2005/0063489 A1* | 3/2005 | Williams | H04L 27/2613 375/316 |
| 2006/0109780 A1* | 5/2006 | Fechtel | H04L 5/06 370/203 |
| 2006/0291537 A1* | 12/2006 | Fullerton | G01S 7/4052 375/145 |
| 2010/0054199 A1* | 3/2010 | Lakkis | H04W 16/14 370/329 |
| 2011/0158402 A1* | 6/2011 | Sichitiu | H04L 9/06 380/42 |
| 2012/0307676 A1* | 12/2012 | Chan | H04W 24/08 370/252 |
| 2017/0013507 A1* | 1/2017 | Lee | H04B 5/0031 |
| 2017/0117979 A1* | 4/2017 | Sengoku | H04L 45/74 |

* cited by examiner

DATA-PACKET PREAMBLE SEQUENCE AND PACKET HEADER, AND PROCESSING METHOD AND DATA FRAME THEREOF

TECHNICAL FIELD

The present invention relates to the field of data transmission, particularly to a data packet preamble sequence and header, and a method for processing a data packet preamble sequence and header.

BACKGROUND ART

Along with the development of the wireless communication technologies and the expansion of their areas of application, users in various fields have been showing increasing demand for wireless devices with large area of coverage and low power requirement, among which the most typical demand is for IoT (Internet of Things) devices; IoT devices access internet through various ways to form a vast network and realize the extension of the internet from people to things; and IoT devices may be various information sensors and controllers, and may also be various smart home appliances.

802.11 Wi-Fi wireless communication standards are currently the most widely used wireless access technology standards; in the field of IoT, Wi-Fi IoT access mode is one of the IoT access modes that are the most widely applied, the most cost effective, and with the best extensibility. In actual applications, most IoT devices perform a single function, and provide relatively small data exchange volumes, and under most circumstances, these devices are mainly powered by batteries, with limited transmitting power, but under most circumstances, during establishment of a Wi-Fi IoT network, spatial distances among the devices are relatively large, and the distribution density of the devices is relatively small. Thus, traditional Wi-Fi access is gradually becoming unable to satisfy the market requirements for low-power and long-distance access.

Normal 802.11b mode at 1 Mbps or 2 Mbps has a lower data rate, and the lowest sensitivity among all the 802.11 modes, so is mostly suitable for low-power and long-distance application scenarios. A measure for improvement commonly found in the conventional technologies is, for the purpose of addressing the requirements for reliable receipt of data portion, to add channel encoding and decoding of MPDU data portion to normal 802.11b mode at 1 Mbps or 2 Mbps, so as to lower the requirements for data receiving sensitivity under such a mode. However, a data frame under normal 802.11b mode further includes a SYNC field and an SFD (Start Frame Delimiter) field in a preamble, and a PLCP header field before a MPDU data field, as illustrated in FIG. 1. Under the circumstances without improvement to the performance of reception and detection for these three fields, if the detection performance of any of the three fields is too low, it may become a bottleneck in packet detection, resulting in that the above described improvement to MPDU data portion is unable to realize sensitivity improvement in actual applications.

SUMMARY OF THE INVENTION

In view of the above described defects existed in the conventional technologies, the present invention proposes a preamble sequence and header for a data packet, a processing method therefor, and a data packet, which may increase reception and detection rates under long-distance weak-signal conditions.

A method for processing a preamble sequence and header for a data packet, comprising the following steps:

using a bit sequence of a fixed pattern to replace a scrambled pseudo-random bit sequence in a SYNC field in the preamble sequence, and spreading the SYNC field by a Barker code;

extending a length of a spreading code and spreading an SFD field in the preamble sequence by the extended spreading code; and extending a length of a spreading code and spreading a header field by the extended spreading code.

The bit sequence of the fixed pattern is a regular sequence.

The length of the spreading code for the SFD field is extended to a periodic combination of an integer multiple of a Barker code, and the length of the spreading code for the header field is extended to a periodic combination of an integer multiple of a Barker code.

The length of the spreading code for the SFD field is extended to a double or quadruple Barker code sequence, and the length of the spreading code for the header field is extended to a double or quadruple Barker code sequence.

Chip rates of the extended spreading codes for the SFD field and the header field are unchanged; a length of a symbol period is extended to an integer multiple of an original symbol period; and a signal bandwidth is unchanged.

A preamble sequence and header for a data packet, comprising:

a preamble sequence, which comprises a SYNC field and an SFD field, wherein the SYNC field comprises a bit sequence of a fixed pattern, and the bit sequence of the fixed pattern is spread by a Barker code;

wherein the SFD field spreading has an extended spreading code for spreading the SFD field in the preamble sequence; and a header field has an extended spreading code for spreading the header field.

The bit sequence of the fixed pattern is a regular sequence.

The length of the spreading code for the SFD field is extended to a periodic combination of an integer multiple of a Barker code, and the length of the spreading code for the header field is extended to a periodic combination of an integer multiple of a Barker code.

The length of the spreading code for the SFD field is extended to a double or quadruple Barker code sequence, and the length of the spreading code for the header field is extended to a double or quadruple Barker code sequence.

Chip rates of the extended spreading codes for the SFD field and the header field are unchanged; a length of a symbol period is extended to an integer multiple of an original symbol period; and a signal bandwidth is unchanged.

A data frame, comprising a preamble sequence and header as above described, and further comprises MPDU data.

As compared with conventional technologies, in weak-signal long-distance application scenarios, the present invention may significantly improve the performance of reception and detection of the preamble sequence and the PLCP header field, better overcome long-distance channel conditions, and enhance the stability of signal transmission; and the present invention uses a combination of the original Barker code to extend the spreading sequence, which only requires little modification to the circuit of a conventional Wi-Fi device, thereby easy to implement.

BRIEF DESCRIPTION OF THE DRAWINGS

In the following, the present invention will be described in detail with reference to the embodiments and the drawings, in which.

DETAILED DESCRIPTION OF THE PREFERRED EMBODIMENTS

Some particular embodiments of the present invention will be further described with reference to the drawings:

In the following, an embodiment of the present invention will be described in detail; the present embodiment is carried out according to a technical solution of the present invention, which illustrates certain implementation details and particular process of operations, but the scope of protection of the present invention is not limited to the following described embodiment.

Figure 3:
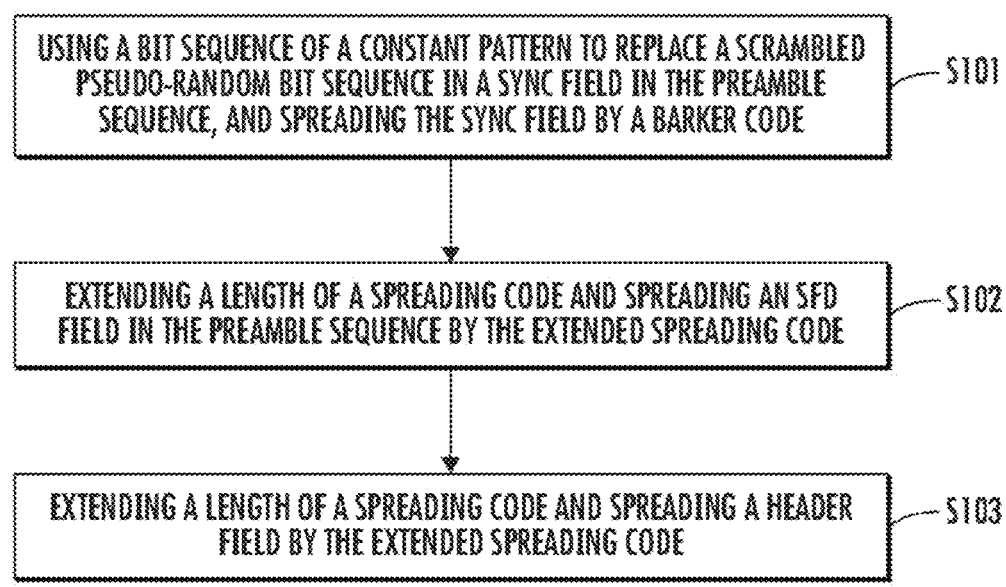
FIG. 3 is a flow chart of a method according to the present invention.

As shown in FIG. 3, a method for processing a data packet preamble sequence and header comprises the following steps of:

using a bit sequence of a fixed pattern to replace a scrambled pseudo-random bit sequence in a SYNC field in the preamble sequence, and spreading the SYNC field by a Barker code; extending a length of a spreading code and spreading an SFD field in the preamble sequence by the extended spreading code; and extending a length of a spreading code and spreading a header field by the extended spreading code.

In the present invention, the bit sequence of the fixed pattern is a regular sequence. The length of the spreading code for the SFD field is extended to a periodic combination of an integer multiple of a Barker code, and the length of the spreading code for the header field is extended to a periodic combination of an integer multiple of a Barker code.

The present invention uses a bit sequence of a fixed pattern to replace a scrambled pseudo-random bit sequence in a SYNC field in the preamble sequence under a normal 802.11b mode, and then performing a normal Barker code spreading; and uses a combination of a fixed pattern integer multiple of a Barker code to spread the bit sequences of the SFD field and the PLCP header field, so as to increase the reception and detection rates of the SYNC field, the SFD field, and the PLCP header field under long-distance weak-signal conditions.

In the present invention, the chip rates of Barker code spreading and the combination of a fixed pattern integer multiple of the Barker code spreading are the same; in other words, for the SFD field and the PLCP header field, their symbol periods are respectively an integer multiple of the symbol period of a normal 802.11b spreading.

In the present invention, the regular sequence may be an alternate sequence, e.g., [1010], or may also a regular sequence of other patterns.

The present invention may significantly improve the performance of reception and detection for the preamble sequence and the PLCP header field, better overcome long-distance channel conditions, and enhance the stability of signal transmission; and the present invention uses the original Barker code to form the extended spreading sequence, which only requires little modification to the circuit of a conventional Wi-Fi device, thereby easy to implement.

A preamble sequence and header for a data packet, comprising:

a preamble sequence, which comprises a SYNC field and an SFD field, wherein the SYNC field comprises a bit sequence of a fixed pattern, and the bit sequence of the fixed pattern is spread by a Barker code;

wherein the SFD field spreading has an extended spreading code for spreading the SFD field in the preamble sequence; and a header field has an extended spreading code for spreading the header field.

The present invention further discloses a data frame, which comprises the above described preamble sequence and header, and further comprises MPDU data.

The SYNC field in the present invention:

the SYNC field for a normal 802.11b mode consists of scrambled 128 bits of 1, and is a pseudo-random sequence; this field is used for signal detection of AGC and frequency offset estimation, and a part of equalizer training, etc. For estimation of frequency offset, the accuracy of its estimation results depends on the dispreading and hard bit decision of the Barker code spread SYNC field. For long-distance weak-signal conditions, hard bit decision result is extremely unreliable, which may cause failure of frequency offset estimation, and in turn weaken the Barker code correlation results of the system, thereby significantly reducing the reliability of signal detection.

In the present invention, the scrambled sequence of the SYNC field is replaced by a regular bit sequence, e.g., an alternate sequence of [0101], such that the property of the relative signs of successive bits in the regular bit sequence being known may be utilized to assist in performing frequency offset detection, allow the frequency offset estimation results to be independent of the hard bit decision result, and enlarge the range of the frequency offset estimation, thereby improving the reliability of detection of the field, so as to overcome larger frequency offset.

Under long-distance weak-signal conditions, since the signal-to-noise ratio is very low, Barker correlation strength is weakened as compared with that under large signal conditions; in order to reliably complete the detection of the SYNC field, without influence the receiving of other fields, the time length of the SYNC field may be appropriately extended according to a target signal strength, so as to improve detection performance.

In the present invention, a SYNC field bit sequence different from that of normal standard 802.11b is adopted, so as to facilitate a receiver to utilize the different correlation characteristics after Barker code spreading of the two types of SYNC bit sequences; during the transmission time of the field, normal standard 802.11b packets and the improved long-distance, low power Wi-Fi packets are distinguished in advance, and signal strength may be further determined, such that different receiving methods may be utilized.

SFD Field:

The SFD field is a start flag of a PLCP data frame; a bit sequence of an SFD field under normal 802.11b mode is subject to spreading modulation by a Barker code of an 11-bit length, and its receiving performance is comparable with the performance of 802.11b at 1 Mbps. After the MPDU field is added with channel encoding and decoding, the performance of reception and detection for the MPDU field is improved, but the performance of reception and detection for the SFD field also needs to be increased correspondingly; otherwise, the receiver may discard the current packet due to SFD reception failure.

In the present invention, a method of extending the length of the spreading code to increase spreading gain is utilized to improve the receiving performance of the SFD field. A preferred spreading sequence is a periodic combination of an integer multiple of the original Barker sequence, preferably a double Barker sequence [+−], a quadruple Barker sequence [+−−+], etc. Here, the chip rate of the extended spreading sequence is unchanged, and only a length of a symbol period is extended to an integer multiple of the original symbol period; thus, the signal bandwidth is unchanged. As compared with spreading by the original Barker code sequence, spreading by the combination of double Barker code sequence and the combination of quadruple Barker code sequence may respectively increase the spreading gain by 3 dB or 6 dB.

Meanwhile, the new spreading sequence is formed by a combination of the original Barker code sequence, so the chip rate is unchanged, which may allow a normal 802.11b device to detect the channel occupation condition so as to avoid packet sending conflict and interference.

PLCP Header Field:

The PLCP header field contains the transmission information of the current packet; in a PLCP packet under normal 802.11b mode at 1 Mbps rate transmission, its receiving performance is comparable with the SFD field. In the PLCP field, 16-bits of CRC verification bits are added after 32 bits of information. For the same reason, if channel encoding and decoding is added to the MPDU field, the receiving verification performance of the field should be increased correspondingly; otherwise, the receiver may discard the current packet due to CRC verification error of the PLCP header field.

Similar to the SFD field, the present invention also utilizes the method of using an extended Barker code spreading sequence for the PLCP header field to increase spreading gain, so as to improve the performance of reception and detection for the PLCP header field.

The extended spreading sequences for the SFD field and the PLCP header field may be the same, or may be different; that is: the two fields may utilize extended spreading sequences of different lengths; for example, one field utilizes the [+−] combination, and the other field utilizes the [+−−+] combination; the two fields may also utilize extended spreading sequences of different combination patterns; for example, one field utilizes the [+−−+] combination, and the other field utilizes the [++−−] combination.

The First Embodiment

Figure 1:
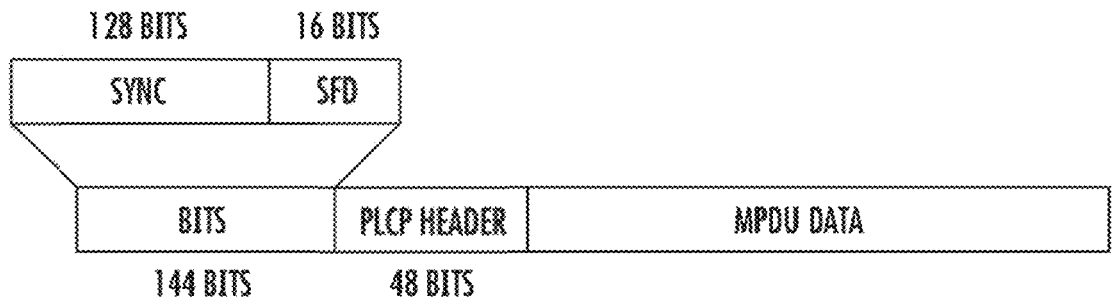
FIG. 1 is an illustrative structural diagram of a PLCP frame according to conventional technologies.
Figure 2:
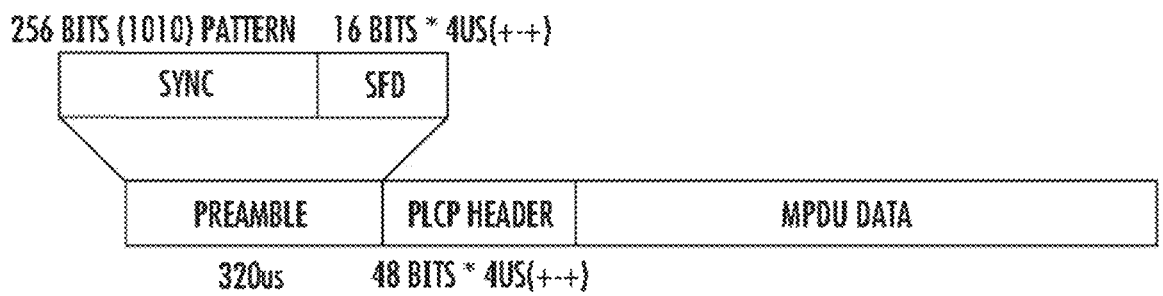
FIG. 2 is an illustrative structural diagram of a PLCP frame according an embodiment of the present invention.

As shown in FIG. 2, a PLCP frame structure of the present invention comprises:

using a [1010] bit sequence having a length of 256 bits to replace a pseudo-random sequence having a length of 128 bits in the SYNC field; spreading by the original Barker code, to achieve a chip rate of 11 MHz, and a total duration of 256 microseconds of the SYNC field.

Doubling the duration of the SYNC field facilitates the AGC signal detection in weak-signal long-distance application scenarios; meanwhile, the [1010] fixed pattern bit sequence allows the frequency offset estimation to be independent of the result of hard bit decision, thereby improving the accuracy and range of frequency offset estimation in weak-signal long-distance applications, ensuring fast and accurate detection of the preamble signal by the AGC.

The SFD field has a length of 16 bits and is spread by a quadruple length [+−−+] Barker code combination spreading sequence, to achieve a chip rate of 11 MHz and a total duration of 64 microseconds.

The PLCP header field has a length of 48 bits and is spread by a quadruple length [+−−+] Barker code combination sequence, to achieve a chip rate of 11 MHz and a total duration of 192 microseconds.

The receiver dispreads the SFD field and the PLCP header field by a quadruple length [+−−+] Barker code combination spreading sequence and may achieve a receiving sensitivity gain of 6 dB. In contrast, the gain achieved by a ½ convolution decoder with the highest encoding redundancy and strongest encoding protection in 802.11 is also approximately 6 dB. Thus, the quadruple length [+−−+] Barker code combination spreading sequence may ensure the SFD field and the PLCP header field to have comparable or higher receiving performance as compared with a channel encoded MPDU data field, thereby solving the problem of bottleneck in receiving the SFD field and the MPDU data field.

The above described are merely preferred embodiments of the present invention, without limiting the present invention; and any modification, equivalent substitution and improvement made within the spirit and principles of the present invention, shall fall within the scope of protection of the present invention.

The invention claimed is:

1. A method for processing a preamble sequence and header for a data packet, comprising the following steps of:

using a bit sequence of a non-scrambled, fixed pattern to replace a scrambled pseudo-random bit sequence in a SYNC field in the preamble sequence, and spreading the SYNC field by a Barker code, wherein relative signs of successive bits in the bit sequence are known by a transmitter and a receiver of the data packet before the data packet is transmitted;

extending a length of a spreading code and spreading an SFD field by the extended spreading code, wherein the length of the spreading code for the SFD field is extended to a periodic combination of an integer multiple of the Barker code; and extending a length of a spreading code and spreading a header field by the extended spreading code, wherein the length of the spreading code for the header field is extended to a periodic combination of an integer multiple of the Barker code.

2. The method for processing a preamble sequence and header for a data packet according to claim 1, wherein the bit sequence of the fixed pattern is a regular sequence.

3. The method for processing a preamble sequence and header for a data packet according to claim 2, wherein chip rates of the extended spreading codes for the SFD field and the header field are unchanged; a length of a symbol period is extended to an integer multiple of an original symbol period; and a signal bandwidth is unchanged.

4. The method for processing a preamble sequence and header for a data packet according to claim 1, wherein the length of the spreading code for the SFD field is extended to a sequence of double or quadruple of the Barker code, and the length of the spreading code for the header field is extended to a sequence of double or quadruple of the Barker code.

5. The method for processing a preamble sequence and header for a data packet according to claim 4, wherein chip rates of the extended spreading codes for the SFD field and the header field are unchanged; a length of a symbol period is extended to an integer multiple of an original symbol period; and a signal bandwidth is unchanged.

6. The method for processing a preamble sequence and header for a data packet according to claim 1, wherein chip rates of the extended spreading codes for the SFD field and the header field are unchanged; a length of a symbol period is extended to an integer multiple of an original symbol period; and a signal bandwidth is unchanged.

* * * * *